(12) United States Patent
Yao et al.

(10) Patent No.: US 6,218,590 B1
(45) Date of Patent: Apr. 17, 2001

(54) ZEOLITE MATERIAL, A METHOD OF MAKING SUCH IMPROVED ZEOLITE MATERIAL AND THE USE THEREOF IN THE CONVERSION OF NON-AROMATIC HYDROCARBONS TO AROMATICS AND LIGHT OLEFINS

(75) Inventors: Jianhua Yao; James B. Kimble; Charles A. Drake, all of Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/510,767

(22) Filed: Feb. 23, 2000

Related U.S. Application Data

(60) Division of application No. 09/188,927, filed on Nov. 9, 1998, now Pat. No. 6,048,815, which is a continuation-in-part of application No. 08/893,199, filed on Jul. 15, 1997, now abandoned.

(51) Int. Cl.[7] .................................................. C07C 2/52
(52) U.S. Cl. ..................... 585/418; 585/407; 585/417; 502/60; 502/63; 502/64; 502/71; 502/77; 502/80
(58) Field of Search ..................... 585/407, 417, 585/418; 502/60, 63, 64, 71, 77, 80

(56) References Cited

U.S. PATENT DOCUMENTS

| | | | |
|---|---|---|---|
| 3,140,253 | 7/1964 | Plank et al. | 208/120 |
| 3,760,024 | 9/1973 | Cattanach | 260/673 |
| 3,960,978 | 6/1976 | Givens et al. | 260/683.15 R |
| 4,021,502 | 5/1977 | Plank et al. | 260/683.15 R |
| 4,157,293 | 6/1979 | Plank et al. | 208/135 |
| 4,263,020 | 4/1981 | Eberly et al. | 55/62 |
| 4,267,072 | 5/1981 | Vasalos | 252/455 Z |
| 4,423,019 | 12/1983 | Bertolacini et al. | 423/244 |
| 4,720,602 | 1/1988 | Chu | 585/407 |
| 4,935,573 | 6/1990 | Aufdembrink et al. | 585/417 |
| 4,937,058 | 6/1990 | Dupin et al. | 423/224 |
| 5,135,898 | 8/1992 | Le Van mao et al. | 502/61 |
| 5,316,991 | 5/1994 | Subramaniane et al. | 502/65 |
| 5,328,675 | 7/1994 | Vaughan et al. | 423/328.2 |
| 5,580,534 | 12/1996 | Hartweg et al. | 423/239.2 |
| 5,641,393 | 6/1997 | Nakagawa | 208/46 |
| 5,856,608 | 1/1999 | Wu et al. | 585/466 |
| 5,883,033 | 3/1999 | Drake et al. | 502/68 |
| 5,886,744 | 2/1999 | Wu et al. | 585/486 |
| 5,895,828 | 4/1999 | Yao et al. | 585/418 |

FOREIGN PATENT DOCUMENTS 7-29948    4/1995   (JP) .

Primary Examiner—Steven P. Griffin
Assistant Examiner—Cam N. Nguyen
(74) Attorney, Agent, or Firm—Jeffrey R. Anderson; Charles W. Stewart

(57) ABSTRACT

A novel high stability catalyst composition comprising a mixture of zeolite and zinc spinel that has been treated with a reducing gas under high temperature conditions, a method of making such high stability catalyst, and the use thereof for converting paraffin hydrocarbons to olefins and aromatics.

53 Claims, 3 Drawing Sheets

ZEOLITE MATERIAL, A METHOD OF MAKING SUCH IMPROVED ZEOLITE MATERIAL AND THE USE THEREOF IN THE CONVERSION OF NON-AROMATIC HYDROCARBONS TO AROMATICS AND LIGHT OLEFINS

This application is a division of application Ser. No. 09/188,297, filed Nov. 9, 1998, U.S. Pat. No. 6,048,815 issued Apr. 11, 2000, which is a continuation-in-part of application Ser. No. 08/893,199 filed Jul. 15, 1997 now abandoned.

BACKGROUND OF THE INVENTION

The invention relates to an improved process for converting non-aromatic hydrocarbons in the presence of an improved zeolite material to aromatic and lower olefin hydrocarbons preferably with a low rate of coke formation during the conversion of such hydrocarbons in the presence of such improved zeolite material.

It is known to catalytically crack non-aromatic gasoline boiling range hydrocarbons (in particular paraffin and olefins) to lower olefins (such as ethylene and propylene) and aromatic hydrocarbons (such as benzene, toluene, and xylenes) in the presence of catalysts which contain a zeolite (such as ZSM-5), as is described in an article by N. Y. Chen et al in Industrial & Engineering Chemistry Process Design and Development, Volume 25, 1986, pages 151–155. The reaction product of this catalytic cracking process contains a multitude of hydrocarbons such as unconverted $C_5+$ alkanes, lower alkanes (methane, ethane, propane), lower alkenes (ethylene and propylene), $C_6$–$C_8$ aromatic hydrocarbons (benzene, toluene, xylenes, and ethylbenzene), and $C_9+$ aromatic hydrocarbons. Depending upon the relative market prices of the individual reaction products, it can be desirable to increase the yield of certain of the more valuable products relative to the others.

One concern with the use of zeolite catalysts in the conversion of hydrocarbons to aromatic hydrocarbons and lower olefins is the excessive production of coke during the conversion reaction. Coke formed during the zeolite catalyzed aromatization of hydrocarbons tends to cause catalyst deactivation. It is desirable to improve processes for the aromatization of hydrocarbons and the formation of lower olefins from hydrocarbons by minimizing the amount of coke formed during such processes. It is also desirable to have a zeolite catalyst that is useful in producing significant quantities of the aromatic and olefin conversion products.

SUMMARY OF THE INVENTION

It is an object of this invention to at least partially convert hydrocarbons to ethylene, propylene and BTX (benzene, toluene, xylene and ethylbenzene) aromatics.

A further object of this invention is to provide an improved process for the conversion of hydrocarbons in which the rate of coke formation during such conversion of hydrocarbons is minimized.

A yet further object of this invention is to provide an improved zeolite material which when used in the conversion of hydrocarbons results in less coke formation than alternative zeolite materials.

A still further object of this invention is to provide an improved zeolite material that gives an improved yield of lower olefins and BTX aromatics when utilized in the conversion of hydrocarbons.

Another object of this invention is to provide hydrocarbon conversion processes which have an acceptably low coke production rate and/or which produces a conversion product containing suitable quantities of olefins and BTX aromatics.

Another further object of this invention is to provide a method for making an improved zeolite material having such desirable properties as providing for lower coke production and favorable production of olefins and BTX aromatics when used in the conversion of hydrocarbons.

The inventive composition is a mixture comprising a zeolite and zinc spinel wherein the mixture has been treated with a reducing gas under higher temperature conditions. The inventive composition may be made by combining a zeolite with zinc spinel to form a mixture and thereafter exposing the mixture with a reducing gas under high temperature conditions thereby forming the inventive composition. The inventive composition may be used in the conversion of non-aromatic hydrocarbons to aromatic hydrocarbons and lower olefins by contacting under conversion conditions a hydrocarbon feedstock with the inventive composition.

Figure 1:
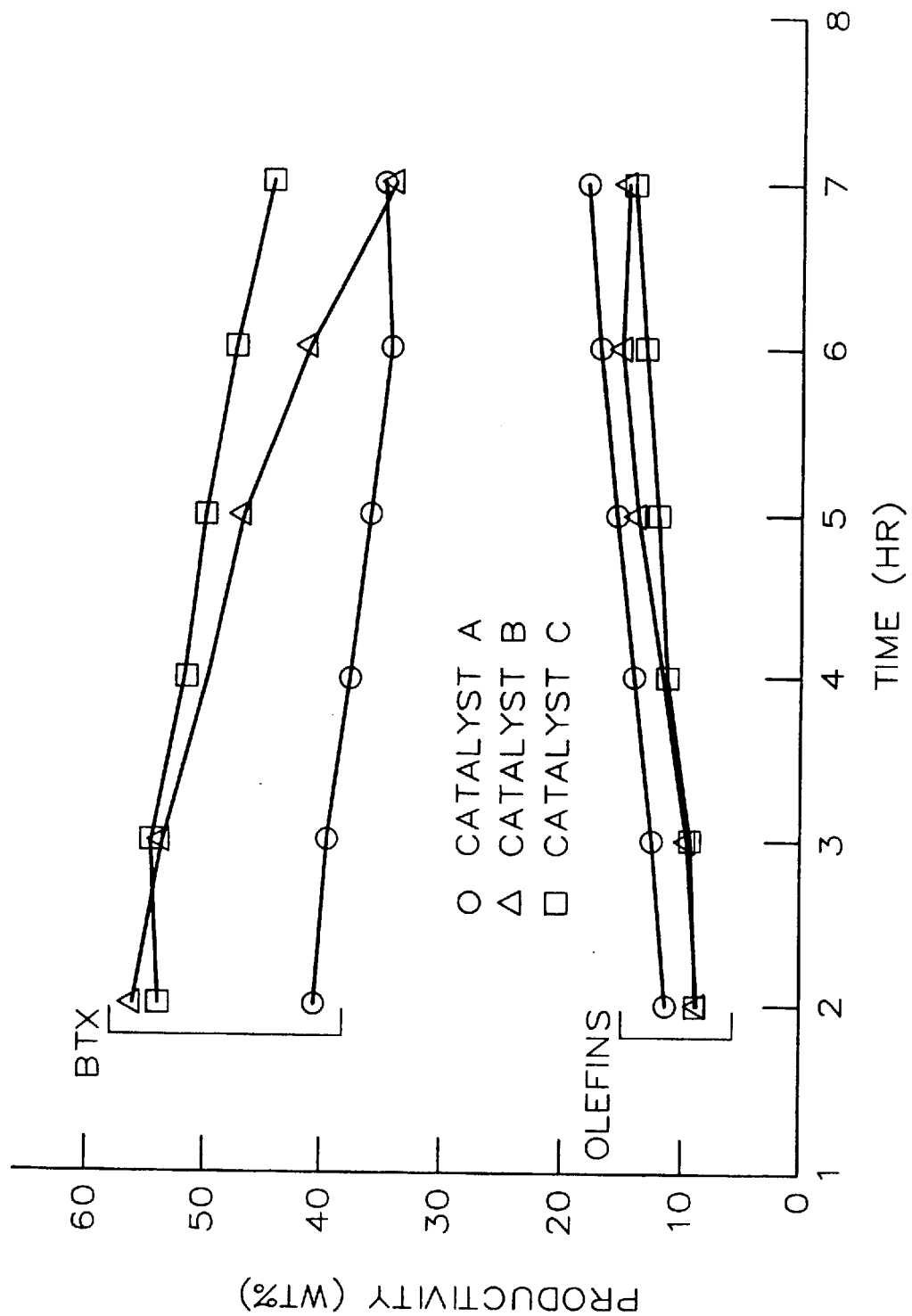
FIG. 1 presents a plot of productivity versus time for comparative zeolite Catalyst A and Catalyst B, comprising a zeolite and zinc aluminate, and for inventive Catalyst C, which is the comparative Catalyst B having been treated with a reducing gas under high temperature conditions, that demonstrates the relative stability of such catalysts.

Other objects and advantages of the invention will become apparent from the detailed description and the appended claims.

DETAILED DESCRIPTION OF THE INVENTION

The zeolite material used in making the inventive composition can be any zeolite which is effective in the conversion of non-aromatics to aromatics when contacted under suitable reaction conditions with non-aromatic hydrocarbons. Preferably, the zeolite has a constraint index (as defined in U.S. Pat. No. 4,097,367, which is incorporated herein by reference) in the range of about 0.4 to about 12, preferably about 2–9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38, and mixtures thereof. Some of these zeolites are also known as "MFI" or "Pentasil" zeolites. The presently more preferred zeolite is ZSM-5.

In the preparation of the inventive composition, a zinc spinel, such as, but not limited to, zinc aluminate, zinc silicate or zinc titanate, is mixed with zeolite to form a mixture. The mixture is further treated with a reducing gas as hereinafter described to provide a novel high stability catalyst composition.

Any suitable method for mixing the zeolite and the zinc spinel, which can include zinc aluminate, or zinc silicate, or zinc titanate or any combination thereof may be used to provide a homogeneous mixture of such components. Suitable types of solids-mixing machines for mixing the components of zeolite and zinc spinel can include, but are not limited to, tumblers, stationary shells or troughs, muller mixers, which are either batch type or continuous type, impact mixtures, and the like. The mixing of the solid particles components can be conducted during any suitable time period necessary to properly homogenize the mixture. Generally, however, the blending time is usually less than 60 minutes. Preferably, the mixing time will be in the range of from about 2 minutes to about 30 minutes.

Following the mixing of the zinc spinel and zeolite components, the resulting mixture is treated with a reducing gas by any suitable manner which provides for the final high stability catalyst composition. In addition to the specific components and their respective concentration ranges within the inventive composition, the treatment of the mixture with a reducing gas is critical to the formation of the final high stability catalyst composition. The treatment of the mixture with a reducing gas thus gives a catalyst composition that when used in the conversion of hydrocarbons to BTX aromatics and olefins yields greater amounts of BTX aromatics and lesser amounts of the less desirable olefins than comparative catalysts. The novel composition has a high stability when compared with certain other catalysts that have not been treated with a reducing gas. When referring herein to catalyst stability, such references are to the length of time a catalyst can be used in a given service and still maintain a suitable activity toward the production of a desired product.

To treat the mixture of zeolite and zinc spinel, the mixture is exposed by any suitable method known in the art to an atmosphere of a reducing gas such as, for example, methane, hydrogen sulfide, carbon monoxide and hydrogen, under temperature and pressure conditions and for a period of time that suitably provide the treated mixture of zeolite and zinc spinel. The preferred reducing gas used to treat the mixture of zeolite and zinc spinel is hydrogen. Generally, the treatment may be conducted at a pressure from about atmospheric pressure to about 1000 pounds per square inch absolute (psia). More typical pressures, however, are in the range of from about atmospheric to about 100 psia. It is an important aspect of the invention for the mixture of zeolite and zinc spinel to be treated with the reducing gas under reasonably high temperatures so as to provide a treated mixture having the desired high stability properties. The treatment temperature is generally in the range of from about 300° C. to about 100° C. Preferably, this temperature range is from about 400° C. to about 900° C. and, most preferably, the treatment temperature is in the range of from 450° C. to 750° C.

The time period for conducting the gas treatment of the mixture must be sufficient to provide a treated mixture having high stability catalytic properties. Generally, the period for exposing the mixture of zeolite and zinc spinel to the reducing gas atmosphere can range from about 0.1 hour to about 300 hours. Preferably, the gas treatment is conducted for a period of from about 0.25 hour to about 250 hours and, most preferably, from 0.5 hour to 200 hours. In certain instances, it may be necessary to perform the gas treatment for longer periods of time in order to provide a catalyst having the desired properties. More particularly, the time period for gas treatment in such instances is in the range of from about 25 hours to about 000 hours, preferably in the range of from about 50 hours to about 750 hours, and most preferably, from 75 hours to 500 hours.

The relative amounts of the zeolite and zinc spinel in the inventive composition should be such as to give concentrations effective in providing the desirable properties of favorable aromatics and olefin conversion yields with low coke production when the inventive composition is employed in the conversion of a hydrocarbon feed. When the zinc spinel is zinc aluminate, the weight percent of zinc aluminate present in the mixture of zeolite and zinc aluminate prior to treatment with a reducing gas is in the range of from greater than zero to about 30 weight percent of the mixture, for example, from about 0.1 weight percent to about 30 weight percent. The preferred concentration of zinc aluminate in the mixture is in the range of from about 5 to about 25 weight percent and, most preferably, from 8 to 20 weight percent.

When the zinc spinel is zinc titanate, the weight percent of zinc titanate present in the mixture of zeolite and zinc titanate prior to treatment with a reducing gas is in the range of from greater than zero to about 20 weight percent, for example, from about 0.05 to about 20 weight percent. The preferred concentration of zinc titanate in the mixture is in the range of from about 0.1 to about 10 weight percent and, most preferably, from 0.5 to 5 weight percent.

When the zinc spinel is zinc silicate, the weight percent of zinc silicate present in the mixture of zeolite and zinc silicate prior to treatment with a reducing gas is in the range of from greater than zero to about 20 weight percent, for example, from about 0.05 to about 20 weight percent. The preferred concentration of zinc silicate in the mixture is in the range of from about 0.1 to about 10 weight percent and, most preferably, from 0.5 to 5 weight percent.

The zeolite present in the mixture is in the range of from greater than about 70 to less than about 100 weight percent of the mixture. Preferably, the zeolite is present in the mixture in the range of from about 75 to about 95 weight percent and, most preferably, from 80 to 92 weight percent.

The inventive composition described herein can also be combined with other materials such as inorganic binders (also called matrix material) preferably selected from the group consisting of alumina, silica, alumina-silica, aluminum phosphate, clays (such as bentonite), and combinations of any two or more thereof to form a composite mixture. The combination of the treated mixture and matrix material can be such that the matrix material is present in the range of from about 1 to about 99 percent of the composite mixture, preferably from about 5 to about 80 weight percent and, most preferably, from 10 to 70 weight percent. Generally, the zeolite and zinc spinel components of the treated mixture can be combined or mixed with the matrix material prior to treatment of the mixture to form the composite mixture or the treated mixture of zeolite and zinc spinel can be mixed or combined with the matrix material to form the composite mixture. The composite mixture can be shaped or agglomerated by any suitable method known by those skilled in the art such as by pelletizing, extruding or tableting. Generally, the surface area of the composited and shaped composition is about 50–700 $m^2$/g, and its particle size is about 1–10 mm.

Any suitable hydrocarbon feedstock which comprises paraffins (alkanes) and/or olefins (alkenes) and/or naphthenes (cycloalkanes), wherein each of these hydrocarbons contains 2–16 carbon atoms per molecule can be used as the feed to be contacted with the inventive compositions under suitable process conditions for obtaining a reaction product comprising lower alkenes containing 2–5 carbon atoms per molecule and aromatic hydrocarbons. Frequently, these feedstocks also contain aromatic hydrocarbons. Non-limiting examples of suitable, available feedstocks include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred feed is a gasoline-boiling range hydrocarbon feedstock suitable for use as at least a gasoline blend stock generally having a boiling range of about 30–210° C. Generally, the content of paraffins exceeds the combined content of olefins, naphthenes and aromatics (if present).

The hydrocarbon feed stream can be contacted by any suitable manner with the inventive compositions described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within a conversion reaction zone, wherein is contained the inventive composition, and under reaction conditions that suitably promote the formation of olefins, preferably light olefins, and aromatics, preferably BTX, from at least a portion of the hydrocarbons of the hydrocarbon feed. The reaction temperature of the contacting step is more particularly in the range of from about 400° C. to about 800° C., preferably, from about 450° C. to about 750° C. and, most preferably, from 500° C. to 700° C. The contacting pressure can range from about atmospheric pressure to about 500 psia, preferably, from about atmospheric to about 450 psia and, most preferably, from 20 psia to 400 psia.

The flow rate at which the hydrocarbon feed is charged to the conversion reaction zone is such as to provide a weight hourly space velocity ("WHSV") in the range of from greater than zero to about 1000 hour$^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the feed to the conversion reaction zone or contacting zone can be in the range of from about 0.25 hours$^{-1}$ to about 250 hours$^{-1}$ and, most preferably, from 0.5 hour$^{-1}$ to 100 hours$^{-1}$.

The following examples are presented to further illustrate this invention and are not to be construed as unduly limiting its scope.

EXAMPLE I

This example illustrates the preparation of several catalysts which were subsequently tested as catalysts in the conversion of a gasoline sample, which had been produced in a commercial fluidized catalytic cracking unit (FCC), to aromatics.

Catalyst A—Zeolite

A 9 gram quantity of commercially available ZSM-5, Zeocat PZ2/50H powder, (provided by Chemie Uetikon) was mixed with 0.28 grams of bentonite. Added to this mixture was a solution of 2.4 grams of chlorhydrol (50% w/w solution, provided by Reheis, Inc.) in 5 ml of water. The resultant material was dried in air at 120° C. for approximately 4 hours and then calcined in air at 520° C. for approximately 3 hours. The dried and calcined material was granulated to a 10–20 mesh material.

Catalyst B

A 20 gram quantity of commercially available ZSM-5 catalyst, ZeoCat PZ2/50H powder, (provided by Chemie Uetikon) was mixed with 3.36 grams of zinc aluminate ($ZnAl_2O_4$) and 0.63 grams of bentonite. A 5.33 gram quantity of chlorhydrol (50% w/w solution, provided by Reheis, Inc.) in 15 ml of water was added to the mixture of zeolite, zinc aluminate, and bentonite. The resultant material was dried in air at 120° C. for 3 hours and then heat treated in air at 520° C. for 3 hours. The dried and heat treated material was granulated to a 10–20 mesh material.

Catalyst C (Invention)

A 5 gram quantity of the above-described Catalyst B was exposed to a hydrogen gas atmosphere at a temperature of 550° C. for 120 hours to provide the inventive high stability catalyst composition.

Catalyst D

A 20 gram quantity of commercially available ZSM-5 catalyst, ZeoCat PZ2/50H powder, (provided by Chemie Uetikon) was mixed with 0.49 grams of zinc titanate ($ZnTiO_3$) and 0.63 grams of bentonite. A 5.33 gram quantity of chlorhydrol (50% w/w solution, provided by Reheis, Inc.) in 15 ml of water was added to the mixture of zeolite, zinc titanate, and bentonite. The resultant material was dried in air at 120° C. for 3 hours and then heat treated in air at 520° C. for 3 hours. The dried and heat treated material was granulated to a 10–20 mesh material.

Catalyst E (Invention)

A 5 gram quantity of the above-described Catalyst D was exposed to a hydrogen gas atmosphere at a temperature of 550° C. for 130 hours to provide the inventive high stability catalyst composition.

Catalyst F

A 20 gram quantity of commercially available ZSM-5 catalyst, ZeoCat PZ2/50H powder, (provided by Chemie Uetikon) was mixed with 0.43 grams of zinc silicate ($Zn_2SiO_4$) and 0.63 grams of bentonite. A 5.33 gram quantity of chlorhydrol (50% w/w solution, provided by Reheis, Inc.) in 15 ml of water was added to the mixture of zeolite, zinc silicate, and bentonite. The resultant material was dried in air at 120° C. for 3 hours and then heat treated in air at 520° C. for 3 hours. The dried and heat treated material was granulated to a 10–20 mesh material.

Catalyst G (Invention)

A 5 gram quantity of the above-described Catalyst F was exposed to a hydrogen gas atmosphere at a temperature of 550° C. for 120 hours to provide the inventive high stability catalyst composition.

EXAMPLE II

This example illustrates the use of the zeolite materials described in Example I as catalysts in the conversion of a gasoline feed to benzene, toluene and xylenes (BTX) and lower olefins (ethylene, propylene).

For each of the test runs, a 3.0 g sample of the catalyst materials described in Example I was placed into a quartz tube reactor (length: about 18 inches; inner diameter: about 0.5 inch). Gasoline boiling range feedstock from a catalytic cracking unit of a refinery was passed through the reactor at a flow rate of about 20 ml/hour, at a temperature of about 550° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph.

Figure 2:
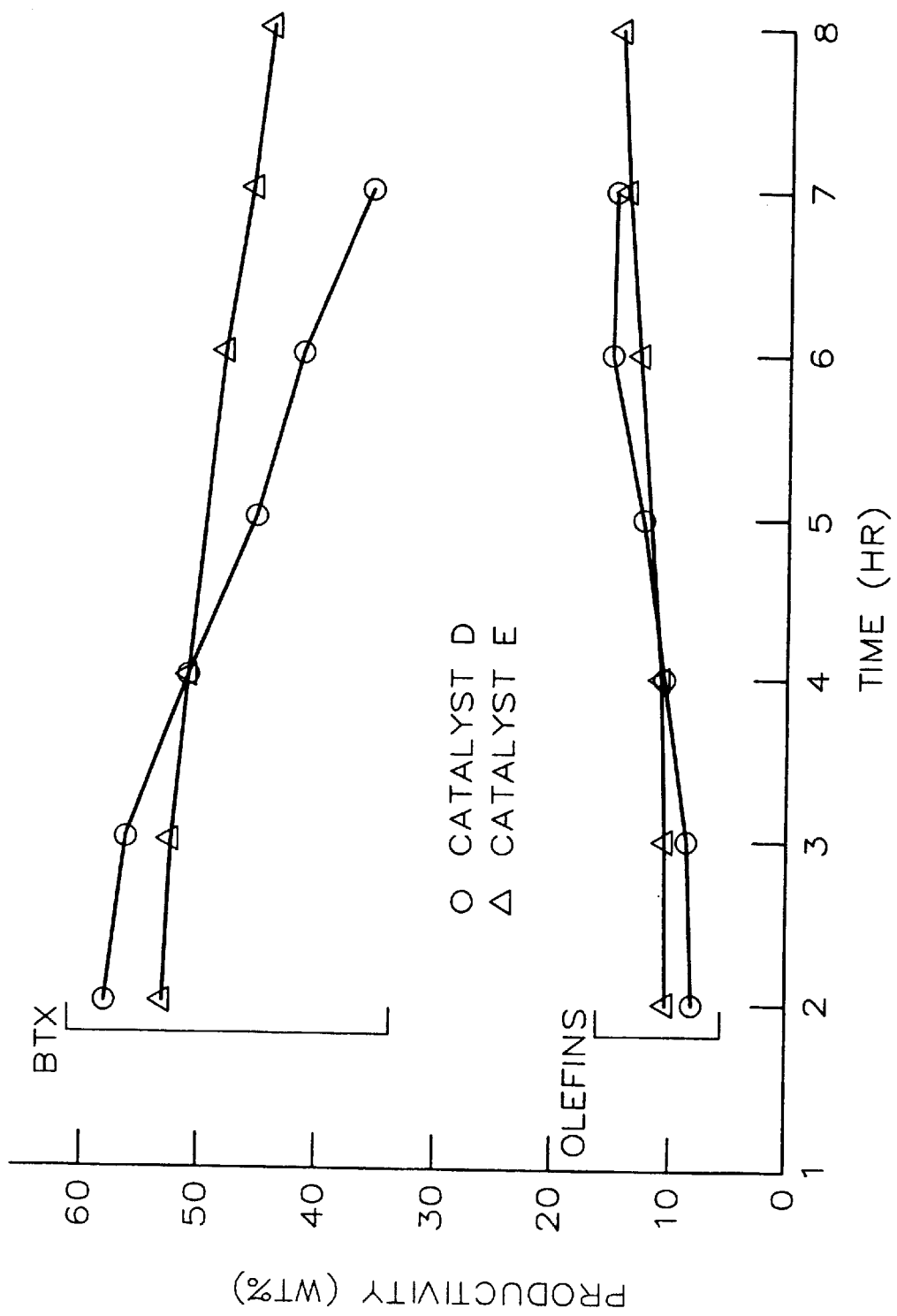
FIG. 2 presents a plot of productivity versus time for comparative Catalyst D, comprising a zeolite and zinc titanate, and for inventive Catalyst E, which is the comparative Catalyst D having been treated with a reducing gas under high temperature conditions, that demonstrates the relative stability of such catalysts.
Figure 3:
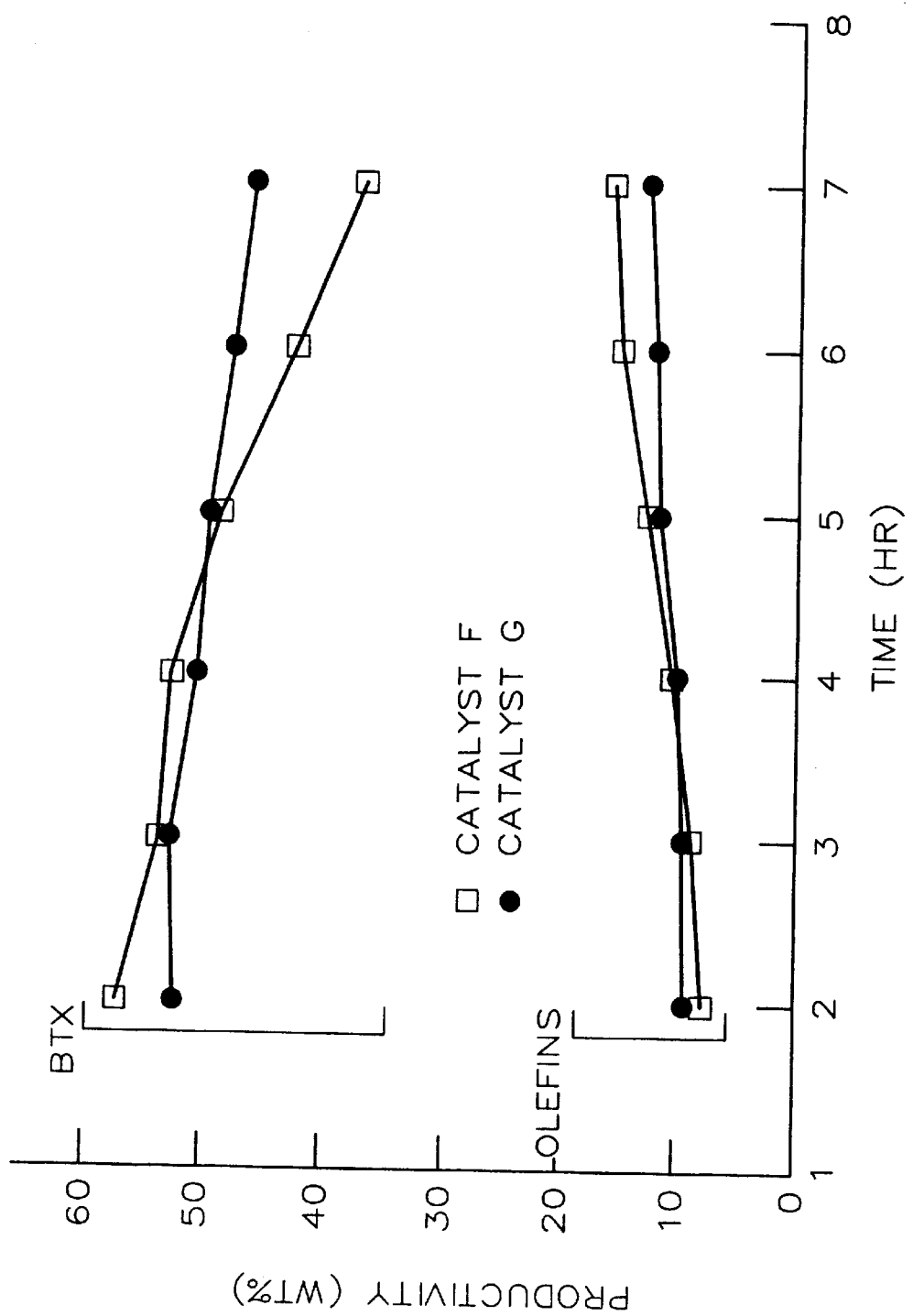
FIG. 3 presents a plot of productivity versus time for comparative Catalyst F, comprising a zeolite and zinc silicate, and for inventive Catalyst G, which is the comparative Catalyst F having been treated with a reducing gas under high temperature conditions, that demonstrates the relative stability of such catalysts.

Presented in Table I are the test runs performed for Catalysts A through G. The data provided include product yields over time and is the data used for FIGS. 1, 2, and 3. The data presented in Table I demonstrates the unexpected improvement in catalyst stability for the inventive Catalysts C, E, and G as compared to the other Catalysts A, B, D and F. The rates of decline in BTX yield for the inventive catalysts are less than the rates of decline for the comparative catalysts. Also, the overall BTX yields of the inventive catalysts are higher than such yields of the comparative catalysts. It should further be noted that the yields of olefins for the inventive catalysts tend to be slightly lower than such yields for the comparative catalysts. This is important when olefin yield is not desired.

TABLE I

Test Runs for Catalysts A through G

| Run Time (hr) | Product Yield | |
|---|---|---|
| | BTX (wt %) | Olefins (wt %) |
| Catalyst A | | |
| 2 | 40.5 | 11.4 |
| 3 | 39.6 | 12.5 |
| 4 | 37.6 | 14.2 |
| 5 | 35.9 | 15.6 |
| 6 | 34.2 | 17.3 |
| 7 | 34.9 | 18.1 |
| Catalyst B | | |
| 2 | 55.9 | 8.8 |
| 3 | 53.6 | 9.6 |
| 5 | 46.9 | 13.9 |
| 6 | 41.1 | 15.0 |
| 7 | 33.8 | 14.9 |
| Catalyst C | | |
| 2 | 53.8 | 8.9 |
| 3 | 54.1 | 9.4 |
| 4 | 51.6 | 11.3 |
| 5 | 50.1 | 12.2 |
| 6 | 47.3 | 13.2 |
| 7 | 44.1 | 14.4 |
| Catalyst D | | |
| 2 | 58.0 | 7.9 |
| 3 | 56.2 | 8.2 |
| 4 | 51.0 | 10.7 |
| 5 | 45.2 | 12.2 |
| 6 | 41.4 | 15.1 |
| 7 | 35.5 | 14.9 |
| Catalyst E | | |
| 2 | 53.0 | 10.2 |
| 3 | 52.4 | 10.3 |
| 4 | 51.0 | 10.8 |
| 6 | 47.9 | 12.8 |
| 7 | 45.8 | 13.8 |
| 8 | 44.2 | 14.3 |
| Catalyst F | | |
| 2 | 57.1 | 7.7 |
| 3 | 53.6 | 8.7 |
| 4 | 52.7 | 10.3 |
| 5 | 48.4 | 12.6 |
| 6 | 42.1 | 14.9 |
| 7 | 36.8 | 15.4 |

TABLE I-continued

Test Runs for Catalysts A through G

| Run Time (hr) | Product Yield | |
|---|---|---|
| | BTX (wt %) | Olefins (wt %) |
| Catalyst G | | |
| 2 | 52.1 | 9.1 |
| 3 | 52.5 | 9.3 |
| 4 | 50.3 | 9.9 |
| 5 | 49.3 | 11.4 |
| 6 | 47.5 | 11.8 |
| 7 | 45.9 | 12.6 |

Reasonable variations, modifications, and adaptations can be made within the scope of the disclosure and the appended claims without departing from the scope of this invention.

That which is claimed is:

1. A process comprising:
    contacting a hydrocarbon feedstock under process conditions suitable for converting at least a portion of said hydrocarbon feedstock to aromatics, with a high stability catalyst composition comprising a mixture comprising a zeolite and zinc spinel, said mixture having been treated with a reducing gas so as to provide a catalyst that when used in the conversion of hydrocarbons to BTX aromatics and olefins yields greater amounts of BTX aromatics and lesser amounts of olefins than an untreated catalyst, wherein the reducing gas comprises a gas selected from the group consisting of methane, carbon monoxide and hydrogen at a temperature in the range of from about 300° C. to about 1000° C.

2. A process as recited in claim 1 wherein said process conditions include a contacting temperature in the range of from about 400° C. to about 800° C., a contacting pressure of from about atmospheric pressure to about 500 psia, and a weight hourly space velocity in the range of from greater than zero to about 1000 hour$^{-1}$.

3. A process as recited in claim 2 wherein said zinc spinel is zinc aluminate.

4. A process as recited in claim 3 wherein the weight percent of zinc aluminate in said mixture is in the range of from greater than zero to about 30 weight percent of said mixture and the weight percent of zeolite in said mixture is in the range of from greater than about 70 to less than about 100 weight percent of said mixture.

5. A process as recited in claim 4 wherein the treatment of said mixture is performed by exposing said mixture to said reducing gas at a treatment pressure from about atmospheric pressure to about 1000 psia for a time period in the range from about 0.1 hour to about 300 hours.

6. A process as recited in claim 5 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

7. A process as recited in claim 6 wherein said reducing gas is hydrogen.

8. A process as recited in claim 3 wherein the weight percent of zinc aluminate in said mixture is in the range of from about 5 to about 25 weight percent and the weight percent of zeolite in said mixture is in the range of from about 75 to about 95 weight percent of said mixture.

9. A process as recited in claim 8 wherein the treatment of said mixture is performed by exposing said mixture to said reducing gas at a treatment pressure from about atmospheric pressure to about 1000 psia for a time period in the range from about 0.1 hour to about 300 hours.

10. A process as recited in claim 9 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

11. A process as recited in claim 10 wherein said reducing gas is hydrogen.

12. A process as recited in claim 3 wherein the zinc aluminate in said mixture is in the range of from 8 to 20 weight percent and the zeolite in said mixture is in the range of from 80 to 92 weight percent.

13. A process as recited in claim 12 wherein the treatment of said mixture is performed by exposing said mixture to said reducing gas at a treatment pressure from about atmospheric pressure to about 1000 psia for a time period in the range from about 0.1 hour to about 300 hours.

14. A process as recited in claim 13 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

15. A process as recited in claim 14 wherein said reducing gas is hydrogen.

16. A process as recited in claim 2 wherein said zinc spinel is zinc titanate.

17. A process as recited in claim 16 wherein the weight percent of zinc titanate in said mixture is in the range of from greater than zero to about 20 weight percent of said mixture and the weight percent of zeolite in said mixture is in the range of from greater than about 70 to less than about 100 weight percent of said mixture.

18. A process as recited in claim 17 wherein the treatment of said mixture is performed by exposing said mixture to said reducing gas at a treatment pressure from about atmospheric pressure to about 1000 psia for a time period in the range from about 0.1 hour to about 300 hours.

19. A process as recited in claim 18 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

20. A process as recited in claim 19 wherein said reducing gas is hydrogen.

21. A process as recited in claim 16 wherein the weight percent of zinc titanate in said mixture is in the range of from about 0.1 to about 10 weight percent and the weight percent of zeolite in said mixture is in the range of from about 75 to about 95 weight percent of said mixture.

22. A process as recited in claim 21 wherein the treatment of said mixture is performed by exposing said mixture to said reducing gas at a treatment pressure from about atmospheric pressure to about 1000 psia for a time period in the range from about 0.1 hour to about 300 hours.

23. A process as recited in claim 22 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

24. A process as recited in claim 23 wherein said reducing gas is hydrogen.

25. A process as recited in claim 16 wherein the zinc titanate in said mixture is in the range of from 0.5 to 5 weight percent and the zeolite in said mixture is in the range of from 80 to 95 weight percent.

26. A process as recited in claim 25 wherein the treatment of said mixture is performed by exposing said mixture to said reducing gas at a treatment pressure from about atmospheric pressure to about 1000 psia for a time period in the range from about 0.1 hour to about 300 hours.

27. A process as recited in claim 26 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

28. A process as recited in claim 27 wherein said reducing gas is hydrogen.

29. A process as recited in claim 2 wherein said zinc spinel is zinc silicate.

30. A process as recited in claim 29 wherein the weight percent of zinc silicate in said mixture is in the range of from greater than zero to about 20 weight percent of said mixture and the weight percent of zeolite in said mixture is in the range of from greater than about 70 to less than about 100 weight percent of said mixture.

31. A process as recited in claim 30 wherein the treatment of said mixture is performed by exposing said mixture to said reducing gas at a treatment pressure from about atmospheric pressure to about 1000 psia for a time period in the range from about 0.1 hour to about 300 hours.

32. A process as recited in claim 31 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

33. A process as recited in claim 32 wherein said reducing gas is hydrogen.

34. A process as recited in claim 29 wherein the weight percent of zinc silicate in said mixture is in the range of from about 0.1 to about 10 weight percent and the weight percent of zeolite in said mixture is in the range of from about 75 to about 95 weight percent of said mixture.

35. A process as recited in claim 34 wherein the treatment of said mixture is performed by exposing said mixture to said reducing gas at a treatment pressure from about atmospheric pressure to about 1000 psia for a time period in the range from about 0.1 hour to about 300 hours.

36. A process as recited in claim 35 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

37. A process as recited in claim 36 wherein said reducing gas is hydrogen.

38. A process as recited in claim 29 wherein the zinc silicate in said mixture is in the range of from 0.5 to 5 weight percent and the zeolite in said mixture is in the range of from 80 to 95 weight percent.

39. A process as recited in claim 38 wherein the treatment of said mixture is performed by exposing said mixture to said reducing gas at a treatment pressure from about atmospheric pressure to about 1000 psia for a time period in the range from about 0.1 hour to about 300 hours.

40. A process as recited in claim 39 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

41. A process as recited in claim 40 wherein said reducing gas is hydrogen.

42. A process as recited in claim 2 wherein the weight percent of zinc spinel in said mixture is in the range of from greater than zero to about 30 weight percent of said mixture and the weight percent of zeolite in said mixture is in the range of from greater than about 70 to less than about 100 weight percent of said mixture.

43. A process as recited in claim 42 wherein the treatment of said mixture is performed by exposing said mixture to said reducing gas at a treatment pressure from about atmospheric pressure to about 1000 psia for a time period in the range from about 0.1 hour to about 300 hours.

44. A process as recited in claim 43 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

45. A process as recited in claim 44 wherein said reducing gas is hydrogen.

46. A process as recited in claim 2 wherein the weight percent of zinc spinel in said mixture is in the range of from about 0.1 to about 25 weight percent and the weight percent of zeolite in said mixture is in the range of from about 75 to about 95 weight percent of said mixture.

47. A process as recited in claim 46 wherein the treatment of said mixture is performed by exposing said mixture to said reducing gas at a treatment pressure from about atmospheric pressure to about 1000 psia for a time period in the range from about 0.1 hour to about 300 hours.

48. A process as recited in claim 47 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

49. A process as recited in claim 48 wherein said reducing gas is hydrogen.

50. A process as recited in claim 2 wherein the zinc spinel in said mixture is in the range of from 0.5 to 20 weight percent and the zeolite in said mixture is in the range of from 80 to 92 weight percent.

51. A process as recited in claim 50 wherein the treatment of said mixture is performed by exposing said mixture to said reducing gas at a treatment pressure from about atmospheric pressure to about 1000 psia for a time period in the range from about 0.1 hour to about 300 hours.

52. A process as recited in claim 51 wherein said mixture is combined with a matrix material selected from the group consisting of alumina, silica, alumina-silica, aluminum phosphate, clays, and combinations of any two or more thereof to thereby form a composite mixture, said composite mixture comprising said matrix material in the range of from about 1 to about 99 weight percent of said composite mixture.

53. A process as recited in claim 52 wherein said reducing gas is hydrogen.

* * * * *